(12) United States Patent
Dittrich et al.

(10) Patent No.: US 8,436,098 B2
(45) Date of Patent: May 7, 2013

(54) USE OF POLYORGANOSILOXANES IN THE PROCESSING AND VULCANIZATION OF RUBBER

(75) Inventors: Uwe Dittrich, Radebeul (DE); Volker Borger, Hamburg (DE); Gisela Thummler, Dresden (DE); Theresia Klose, Dresden (DE)

(73) Assignee: Schill + Seilacher "Struktol" GmbH, Hamburg (DE)

( * ) Notice: Subject to any disclaimer, the term of this patent is extended or adjusted under 35 U.S.C. 154(b) by 0 days.

(21) Appl. No.: 13/056,454

(22) PCT Filed: Jul. 30, 2009

(86) PCT No.: PCT/EP2009/005541
§ 371 (c)(1),
(2), (4) Date: Jan. 28, 2011

(87) PCT Pub. No.: WO2010/012475
PCT Pub. Date: Feb. 4, 2010

(65) Prior Publication Data
US 2011/0178249 A1    Jul. 21, 2011

(30) Foreign Application Priority Data
Jul. 31, 2008   (EP) .................................. 08013752

(51) Int. Cl.
*C08L 83/00*    (2006.01)
*C08L 101/00*   (2006.01)
*C08G 77/38*    (2006.01)

(52) U.S. Cl.
USPC ........... 525/209; 525/232; 525/238; 525/240; 525/241

(58) Field of Classification Search ................. 525/209, 525/232, 238, 240, 241
See application file for complete search history.

(56) References Cited

U.S. PATENT DOCUMENTS

| 4,172,101 | A  | 10/1979 | Getson |
| 4,293,678 | A  | 10/1981 | Carter et al. |
| 4,503,208 | A  | 3/1985  | Lin et al. |
| 4,560,719 | A  | 12/1985 | Nakamura et al. |
| 4,698,406 | A  | 10/1987 | Lo et al. |
| 5,010,137 | A  | 4/1991  | Umeda et al. |
| 5,256,754 | A  | 10/1993 | Takarada et al. |
| 5,593,787 | A  | 1/1997  | Dauth et al. |
| 5,952,419 | A  | 9/1999  | DeGroot, Jr. et al. |
| 6,140,393 | A  | 10/2000 | Bomal et al. |
| 6,140,450 | A  | 10/2000 | Ishikawa et al. |
| 6,245,834 | B1 | 6/2001  | Bomal et al. |
| 2004/0023926 | A1 | 2/2004 | Guennouni et al. |
| 2004/0116593 | A1 | 6/2004 | Lai et al. |
| 2004/0266940 | A1 | 12/2004 | Issari |
| 2005/0079928 | A1 | 4/2005 | Kataoka et al. |
| 2005/0143514 | A1 | 6/2005 | Guerin |
| 2007/0249772 | A1 | 10/2007 | Chorvath et al. |

FOREIGN PATENT DOCUMENTS

| DE | 30 44 237    | 9/1981  |
| EP | 0 247 501    | 12/1987 |
| EP | 0 269 114    | 6/1988  |
| WO | 2007/033801  | 3/2007  |

OTHER PUBLICATIONS

International Search Report dated Mar. 25, 2010 in corresponding PCT/EP2009/005541 filed Jul. 30, 2009.
International Preliminary Report on Patentability dated Feb. 8, 2011 in corresponding PCT/EP2009/005541 filed Jul. 30, 2009.
European Search Report dated Feb. 16, 2009 in corresponding EP 08013752.4 filed Jul. 31, 2008.
Dow Corning Corporation Material Safety Data Sheet, Silastic(R) GP-50 Silicone Rubber, Jan. 22, 2011.

*Primary Examiner* — Nathan M Nutter
(74) *Attorney, Agent, or Firm* — Hovey Williams LLP

(57) ABSTRACT

The invention relates to the use of polyorganosiloxanes having 3 or more siloxane units, which has (i) at least one organic component $R^1$, where $R^1$ has at least one carbon-carbon multiple bond, and (ii) at least one hydrocarbon component $R^2$, where $R^2$ has a chain length of 5 to 50 carbon atoms. The polyorganosiloxanes are used in the processing and vulcanization of rubber and are incorporated reactively into it. They give rise to a lowering in the viscosity of the rubber in the course of processing and in some cases to an improvement in the mechanical properties of the vulcanized rubber.

11 Claims, No Drawings

USE OF POLYORGANOSILOXANES IN THE PROCESSING AND VULCANIZATION OF RUBBER

RELATED APPLICATIONS

This application claims priority to PCT International Patent Application No. PCT/EP2009/005541, filed Jul. 30, 2009, which claims the priority benefit of EP Patent Application No. 08013752.4, filed Jul. 31, 2008, both of which are hereby incorporated by reference in their entirety.

The present invention relates to the use of polyorganosiloxanes as an additive in the processing of rubber. The polyorganosiloxane can be used as a pure substance, as a masterbatch or as a blend. The invention further relates to selected novel polyorganosiloxanes, to a process for peroxidic vulcanization of rubber, and to a vulcanized rubber (vulcanizate).

Various types of rubber and rubber mixtures can be processed only with difficulty due to their high viscosity or their tendency to adhere too strongly on the roller system or in the internal mixer. For example, in the case of processing by injection molding, it may be the case that not all cavities of a mold are filled, which results in a high reject rate. For this reason, flow improvers (viscosity reducers) are added as additives to the rubber. For example, it is customary to add fatty acid derivatives, waxes or silicone compounds as flow improvers.

The use of flow improvers reduces the viscosity of the rubber in the course of processing, as desired. However, the rubber is also diluted by the addition of the flow improver. The result of this is that the mechanical properties of the vulcanized rubber generally deteriorate compared to a rubber vulcanized without flow improver. Moreover, in the case of addition of flow improvers in particular cases, especially at high additive concentrations, the occurrence of usually undesired exudance in the vulcanizate obtained is observed.

It is also known that the desired mechanical properties (such as compression set, modulus and tear resistance) of rubber can be improved or actually achieved in the first place by vulcanization. Vulcanization crosslinks the long-chain rubber molecules, and the raw rubber with plastic properties forms vulcanized rubber with elastic properties (vulcanizate). A rubber can be crosslinked in various ways. For example, for the crosslinking, sulfur can be used in conjunction with the known accelerator systems or organic peroxides, for example bis(1-methyl-1-phenylethyl) peroxide (dicumyl peroxide). Peroxidic crosslinking is preferred in particular cases, since selected mechanical values, for example the compression set, are improved compared to sulfur vulcanization. More particularly, the thermal stability (aging resistance) of the vulcanizate obtained by peroxidic vulcanization is distinctly superior to a vulcanizate which has been crosslinked with sulfur. The reason for this is the higher dissociation energy of carbon-carbon bonds compared to carbon-sulfur or sulfur-sulfur bonds.

In the present description, the term "rubber mixture" is used synonymously with the term "rubber", because mixtures of different rubber types are frequently used.

Many rubbers, for example natural rubber (NR) and ethylene-propylene-diene monomer rubber (EPDM), can be vulcanized either with sulfur or with peroxides. Other rubbers in turn, for example ethylene-acrylate rubber (AEM), can be vulcanized with different vulcanization systems (diamines, peroxides), but not with sulfur.

For applications which require a high oxidation resistance, preference is given to using rubber without unsaturated functionalities (for example double bonds) in the molecule chain. Rubber without unsaturated functionalities is not vulcanizable with sulfur and is typically crosslinked with peroxides.

The degree of crosslinking achievable in peroxidic vulcanization depends on several factors and is insufficient in particular cases, and so preference is given to adding crosslinking aids (coagents). By means of such coagents, the crosslinking density is increased, and hence a further improvement in the mechanical values is achieved compared to a vulcanization without crosslinking aids. Known representatives for crosslinking of rubbers by peroxidic vulcanization are triallyl cyanurate (TAO), triallyl isocyanurate (TAIL), trimethylolpropane trimethacrylate (TMPTMA), ethylene glycol dimethacrylate (EDMA), 1,6-hexanediol diacrylate (HDDA) or N,N'-m-phenylenebismaleimide (MPBM).

It is possible to counteract the undesired deterioration in the mechanical properties of the vulcanizate which is possible in the case of use of flow improvers by using a particularly high amount of coagents. Such an addition of coagents leads to compensation for the dilution effect of the flow improver. However, the use of coagents generally does not make any contribution to lowering the Mooney viscosity, but merely adds a further constituent to the rubber mixture. The poor solubility of polar coagents in nonpolar rubbers can also lead to inhomogeneities in the network to be formed. This effect is correspondingly more pronounced at higher dosages.

Tight limits are thus set for the unvulcanized rubber processor/vulcanized rubber manufacturer; Firstly, the rubber must have good processability and should therefore contain flow improvers; secondly, the mechanical properties of the vulcanized rubber should not deteriorate undesirably as a result of addition of the flow improver. Furthermore, it is undesired in most cases that the flow improvers added exude to arrive at the surface of the rubber mixture or of the vulcanizate. The maintenance of the mechanical properties necessitates the addition of (comparatively large amounts of) coagents, which can likewise be disadvantageous as mentioned.

EP 0 247 501 B1 relates to a process for preparing methacryloyloxy- or acryloyloxy-containing organosilanes and organosiloxanes. What is disclosed is the preparation of γ-methacryloyloxypropyltrimethoxysilane. Use of the products is not taught.

It was an object of the present invention to provide compounds which can help to improve the viscosity of rubber in the course of processing, without deterioration in the mechanical properties of the resulting vulcanizate (for example, the lowering of modulus). Preferably, compounds should be provided that both lower the viscosity of the rubber mixture in the course of processing and improve the mechanical properties of the vulcanizate obtained after the vulcanization.

According to the invention, it has been found, surprisingly, that this object is achieved by the use of particular polyorganosiloxanes as an additive in the processing of rubber.

The polyorganosiloxanes used in accordance with the invention are notable in that they have 3 or more siloxane units and (i) one or more organic moieties $R^1$, where $R^1$ has one or more carbon-carbon multiple bonds, and (ii) one or more hydrocarbon moieties where $R^2$ has a chain length of 5 to 50 carbon atoms.

According to the invention, the polyorganosiloxane, in the (peroxidic) vulcanization, is incorporated by reaction into the rubber, which prevents the formation of exudance at the surface of the vulcanized rubber. The inventive polyorganosiloxane improves the processability and possibly also the crosslinking density of rubbers in the vulcanization. Preferably, both the processability and the crosslinking are influenced positively.

1. Organic Moiety $R^1$

Polyorganosiloxanes used in accordance with the invention have one or more organic moieties $R^1$, where $R^1$ has one or more carbon-carbon multiple bonds.

It is preferred that the carbon-carbon multiple bond in $R^1$ is a carbon-carbon double bond, for example in a carbon chain or a ring of carbon atoms. In a preferred embodiment, the organic moiety $R^1$ is a monovalent radical.

Examples of possible $R^1$ groups include cycloalkenyl, alkenyl, vinyl, allyl, norbornyl, (di)cyclopentenyl, or groups derived from methacrylate or acrylate. Preferred monovalent $R^1$ radicals are derived from cyclohexene and (meth)acrylate, which are bonded to the backbone of the polyorganosiloxane via a hydrocarbon chain which may be substituted by one or more heteroatoms such as oxygen or sulfur, and/or interrupted by one or more heteroatoms such as oxygen and sulfur.

Particularly preferred examples of $R^1$ are the following groups:

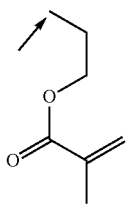
(a)

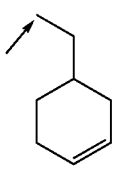
(b)

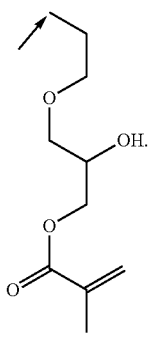
(c)

In these structures, the carbon atom which is bonded to the silicon atom is marked with an arrow in each case.

These functionalizations are obtainable by reaction of an SiH unit with a compound which has a double bond amenable to hydrosilylation, for example:
(a) allyl (meth)acrylate,
(b) 4-vinylcyclohexene, or
(c) allyl glycidyl ether with subsequent opening of the epoxide ring by reaction with (meth)acrylic acid.

The number of carbon atoms between the silicon atom which bears the $R^1$ group and the carbon-carbon multiple bond is preferably 1 to 10, more preferably 2 to 6, for example 4.

In a preferred embodiment, the inventive polyorganosiloxane has one (or more) vinyl group(s) which is (are) bonded directly to a silicon atom; in this preferred embodiment, as well as the vinyl group(s), one (or more) other moiety(s) $R^1$ are present. An alternative is a likewise preferred embodiment, in which the inventive polyorganosiloxane does not have a vinyl bonded directly to a silicon atom.

In a preferred embodiment, $R^1$ is present in the inventive polyorganosiloxane as part of the structural unit I

$$[R^1_x R_a SiO_{[4-(x+a)]/2}] \quad\quad (I),$$

where x is 1, 2 or 3 and is preferably 1, a is 0, 1 or 2, preferably 1 or 2 and especially 1, and R is a monovalent organic radical. Preferably, R is selected from methyl, ethyl, propyl and phenyl, and R is more preferably methyl.

Preferred structural units I where x=1 are a difunctional structural unit $I^D$ where a=1:

$$[R^1 R SiO_{2/2}] \quad\quad (I^D),$$

and a monofunctional structural unit $I^M$ where a=2:

$$[R^1 R_2 SiO_{1/2}] \quad\quad (I^M)$$

2. Hydrocarbon Moiety $R^2$

Inventive polyorganosiloxanes have one or more hydrocarbon moieties $R^2$, where $R^2$ has a chain length of 5 to 50 carbon atoms. The hydrocarbon moiety $R^2$ is preferably a monovalent hydrocarbyl radical.

It is also preferred that the hydrocarbon moiety of the inventive polyorganosiloxane does not have any carbon-carbon multiple bonds.

In addition, it is preferred in all embodiments of the invention that $R^2$ is selected from branched or unbranched alkyl groups, such as n-$C_8$ to —$C_{30}$ alkyl, preferably n-$C_{10}$ to —$C_{26}$ alkyl, more preferably n-$C_{12}$ to —$C_{18}$ alkyl, for example n-$C_{18}$ alkyl.

Preferably, the monovalent hydrocarbon moiety $R^2$ in the polyorganosiloxane is present as part of the unit II

$$[R^2_y R'_b SiO_{[4-(y+b)]/2}] \quad\quad (II),$$

where y is 1, 2 or 3 and is preferably 1, b is 0, 1 or 2, preferably 1 or 2 and especially 1, and R' is a monovalent organic radical. It is preferred that R' is selected from methyl, ethyl, propyl and phenyl, and R' is more preferably methyl.

Preferred structural units II where y=1 are a difunctional structural unit $II^D$ where b=1:

$$[R^2 R' SiO_{2/2}] \quad\quad (II^D),$$

and a monofunctional structural unit $II^M$ where b=2:

$$[R^2 R'_2 SiO_{1/2}] \quad\quad (II^M).$$

3. Structure of the Polyorganosiloxane

In addition to the structural units I and II mentioned, which are preferably present, inventive polyorganosiloxanes preferably also have the difunctional structural unit $III^D$:

$$[R''_2 SiO_{2/2}] \quad\quad (III^D)$$

where the R'' radicals are the same or different (and are preferably the same) and are each selected from linear, branched or cyclic organic radicals which may be bonded via an oxygen atom, and the R'' radicals are preferably methyl, ethyl, propyl and phenyl, especially methyl.

Preferably, in the inventive polyorganosiloxane, one or—more preferably—two monofunctional structural units $IV^M$ is (are) also present:

$$[R'''_3 SiO_{1/2}] \quad\quad (IV^M)$$

where the R''' radicals are the same or different and are each selected from hydroxyl and linear, branched or cyclic organic radicals which may be bonded via an oxygen atom, and the R''' radicals are preferably hydroxyl, methyl, ethyl, propyl and phenyl, especially hydroxyl and methyl. In a particularly preferred embodiment, the R''' radicals are the same and are each methyl groups.

A preferred structure of an inventive polyorganosiloxane is as follows:

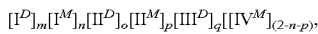

where
(i) m and o are each independently in the range from 0 to 40 and n and p may each independently be 0, 1 or 2,
    with the proviso that the sum of (m+n) is at least 1 and the sum of (o+p) is at least 1,
    with the further proviso that the sum of (n+p) is at most 2,
    where the sum of (m+n+o+p) is preferably in the range up to 20, and
(ii) q is in the range from 0 to 100.

In this structure, the difunctional structural units $I^D$, $II^D$ and $III^D$ in the inventive polyorganosiloxane are typically and preferably not arranged as a block, but rather distributed randomly along the polysiloxane chain. It is also clear to the person skilled in the art that the parameters m, n, o, p and q are average values, because the inventive polyorganosiloxanes are typically not obtained as homogeneous compounds in the preparation.

In a preferred embodiment, n is zero (0), i.e. the functionalization $R^1$ is present in difunctional (bridging) structural units $I^D$ in the polyorganosiloxane. Such an embodiment is preferred in particular when the polyorganosiloxane used in accordance with the invention is intended in particular to promote the crosslinking of the rubber in the vulcanization.

In a further preferred embodiment, n is 1 or 2 and preferably 1, i.e. the functionalization $R^1$ is present in the polyorganosiloxane (at least also) in monofunctional (terminal) structural units $I^M$. Such an embodiment is preferred in particular when the polyorganosiloxane used in accordance with the invention is to serve principally for chain extension of the rubber in the vulcanization.

In all embodiments of the invention, it is preferred that the moiety $R^1$ is bonded to a different silicon atom than the moiety $R^2$.

In a preferred embodiment, the total number of siloxane units of the inventive polyorganosiloxanes (m+o+q+2) is 10 to 100, more preferably 15 to 70, especially 20 to 50, such as 25 to 40.

In a further preferred embodiment, the sum of the functionalized siloxane units in the inventive polyorganosiloxanes (m+n+o+p) is 2.5 to 15, more preferably 3 to 10.

Preferred ratios of the functionalizations with $R^1$ and $R^2$ in difunctional siloxane units $I^D$ and $II^D$ are (i.e. m/o is) 10/90 to 99/1, more preferably 30/70 to 98/2, especially 50/50 to 97/3, such as 70/30 to 96/4 or 75/25 to 95/5.

The number of unsubstituted difunctional siloxane units $III^D$ (q) in the inventive polyorganosiloxanes is preferably 5 to 60, more preferably 10 to 50, especially 15 to 40, such as 20 to 30.

Finally, it is possible in accordance with the invention that the polyorganosiloxane has the monovalent organic $R^5$ radical which has both at least one moiety $R^1$ and at least one moiety $R^2$. Such $R^5$ radicals may have moieties derived from (meth)acrylic acid and a long alkyl chain. This embodiment, however, is not preferred.

Inventive polyorganosiloxanes may be present as compounds which are liquid at room temperature (25° C.) and have a high viscosity. Depending on factors including the length of the siloxane chain (i.e. sum of the SIC units, sum of (m+o+q+2), from about 30), the length of the hydrocarbon moiety $R^2$ (from about 20 carbon atoms) and the number of hydrocarbon moieties $R^2$, the inventive polyorganosiloxanes may be solid at room temperature.

It is possible to use the inventive polyorganosiloxane as a masterbatch which comprises
a) one or more rubbers and
b) one or more inventive polyorganosiloxanes.

The masterbatch preferably contains 0.5 to 30 parts by weight of inventive polyorganosiloxane, more preferably 0.5 to 20 parts by weight and especially 0.5 to 10 parts by weight of polyorganosiloxane, based on 100 parts by weight of rubber (phr, parts per hundred of rubber). Typically used in the masterbatch as rubbers are peroxidically crosslinkable types, for example natural rubber (NR), polybutadiene (BR), acrylonitrile-butadiene rubber (NBR, HNBR), ethylene-propylene rubber (EPM, EPDM), chlorinated or chlorosulfonated polyethylene (CM, CSM), terpolymers of epichlorohydrin rubber (GECO), fluoro rubbers (FKM, FFKM, TFE/P), acrylate rubbers (ACM, AEM), ethylene-vinyl acetate rubber (EVA, EVM), silicone rubber (VMQ, PMQ, PVMQ, FVMQ), polyoctenamer (Vestenamer), polyurethane rubber or thermoplastic elastomers (TPE).

The use of a masterbatch facilitates the incorporation of the inventive polyorganosiloxane into a rubber.

Furthermore, it is possible to use the inventive poly-organosiloxane in the form of a blend which comprises
a) one or more solid carrier materials (preferably selected from inorganic fillers (for example silica) or waxy materials (for example polyethylene waxes)) and
b) one or more inventive polyorganosiloxanes.

The weight ratio of a) carrier material to b) inventive polyorganosiloxane in the blend is preferably 10/90 to 90/10, more preferably 20/80 to 80/20 and especially preferably about 60/40. Preferred materials for blends are silicas or other inorganic fillers, for example chalk or waxy materials, for example polyethylene waxes.

The use of a blend facilitates especially the handling of the inventive polyorganosiloxanes when they are liquid at room temperature.

4. Process for Preparing Inventive Polyorganosiloxanes

In a preferred process for preparing the inventive polyorganosiloxanes,
a) a polyorganosiloxane which has two or more SiH groups is reacted with a compound which has at least one $R^1$ group in order to obtain a polyorganosiloxane having at least one $R^1$ group and one or more remaining SiH groups, and
b) the polyorganosiloxane obtained in step a) is reacted with an α-olefin in order to obtain an inventive polyorganosiloxane.

In an alternative process for preparing the inventive polyorganosiloxanes,
a) a silane which has one or more hydrolyzable groups is functionalized with an $R^1$ group,
b) a silane which has one or more hydrolyzable groups is functionalized with an $R^2$ group,
c) the compound obtained in step a) is reacted with the compound obtained in step b) together with a compound which affords the siloxane backbone, such as octamethylcyclotetrasiloxane, under basic conditions in water.

5. Use and Vulcanization Process

According to the invention, the polyorganosiloxanes are preferably used in the processing of rubber, for example to improve the release performance on a roller system or in an internal mixer, to reduce the Mooney viscosity, to increase the modulus of the vulcanized rubber mixture, or tensile strength, to reduce the compression set, to reduce elongation at break and/or to reduce tear propagation resistance. The inventive polyorganosiloxane is optionally used in the form of the masterbatch or of the blend.

The rubber or the rubber phase is preferably peroxidically vulcanizable. For example, can be natural rubber (NR), polybutadiene (BR), acrylonitrile-butadiene rubber (NBR, HNBR), ethylene-propylene rubber (EPM, EPDM), chlorinated or chlorosulfonated polyethylene (CM, CSM), polyisoprene rubber (IR), styrene-butadiene rubber (SBR), chloroprene rubber (CR), polyethylene (PE), acrylonitrile-butadiene-styrene rubber (ABS), terpolymers of epichlorohydrin rubber (GECO), fluoro rubbers (FKM, FFKM, TFE/P), acrylate rubbers (ACM, AEM), ethylene-vinyl acetate rubber (EVA, EVM), silicone rubber (VMQ, PMQ, PVMQ, FVMQ), polyoctenamer (Vestenamer), polyurethane rubber or thermoplastic elastomers (TPE). Preferably, however, the inventive polyorganosiloxane is not used in silicone rubber.

Particular preference is given to EPM, EPDM, CSM, FPM, IR, BR, CR, AEM, EVM, EVA, NRR and HNBR, and, as mentioned, mixtures of the rubber types mentioned may also be used.

A typical amount of polyorganosiloxane used in accordance with the invention is 0.1 to 50 parts by weight per 100 parts by weight of rubber (mixture) (phr, parts per hundred of rubber), preferably 0.5 to 20 phr, especially 1 to 10 phr, such as 2 to 8 phr, for example about 4 phr.

The invention further relates to a process for vulcanizing rubber, in which a vulcanization mixture which comprises
(i) one or more peroxidically crosslinkable rubbers (for example NR, BR, NBR, HNBR, EPM, EPDM, CM, CSM, GECO, FKM, FFKM, TFE/P, ACM, AEM, EVA, EVM, VMQ, PMQ, PVMQ, FVMQ or TPE),
(ii) one or more peroxidic vulcanizing agents and
(iii) one or more inventive polyorganosiloxanes
is peroxidically vulcanized at a temperature of, for example, 120° C. to 250° C.

A vulcanization mixture preferably further comprises additives such as fillers (for example carbon black, silica, calcium carbonate, barium sulfate, zinc oxide, magnesium oxide, aluminum oxides, iron oxides, silicates), plasticizer oils (for example mineral oils), aging stabilizers, vulcanization aids peroxide, further vulcanization aids (for example sulfur), and flame retardants (for example aluminum hydroxide, magnesium hydroxide, calcium hydroxide or phosphorus compounds) in customary amounts.

By virtue of the vulcanization, in which the inventive polyorganosiloxanes are reactively crosslinked via the unsaturated moiety $R^1$, the hydrocarbon moiety $R^2$ is also incorporated chemically into the rubber. Thus, the crosslinking of the peroxidically vulcanizable rubber mixtures is improved and, furthermore, the further processability thereof is improved by means of lowering the viscosity. The combination of two functional groups in one polyorganosiloxane avoids an undesired dilution effect.

EXAMPLES (i) Preparation of Polyorganosiloxanes
Polyorganosiloxane A:

In a first reaction stage, in a three-neck flask, 43.74 g (0.017 mol) of polyhydromethylsiloxane, 34.00 g (0.209 mol) of hexamethyldisiloxane and 622.26 g (2.095 mol) of octamethyl-cyclotetrasiloxane were converted under an acid-activated calcium bentonite catalyst (3%) to a methylhydrodimethylpolysiloxane. This methylhydrodimethylpolysiloxane had the following average composition:

$$M_2D^H{}_3D_{37},$$

which means that, among the silicon atoms of the total of (on average) 42 siloxane units in the compound, (an average of) three are each substituted by a hydrogen atom ($D^H$) and are amenable to the subsequent functionalization. In this compound, in addition, (an average of) two monofunctional (terminal) trimethylsiloxane units M and (an average of) 37 difunctional dimethylsiloxane units D are present.

In the second reaction stage, 40.9 g (0.162 mol) of 1-octadecene and 15.91 g (10% of the starting weight, 0.005 mol) of the methylhydrodimethylpolysiloxane prepared in the first stage were heated to 60° C. This was followed by the addition of the catalyst (10 ppm of Karstedt catalyst), and the remaining 143.19 g (0.046 mol) of the methylhydrodimethylpolysiloxane were slowly added dropwise. The reaction proceeded at 95° C. and was monitored by means of an HSi measurement by infrared spectroscopy. Once no HSi was detectable any longer and the reaction was accordingly complete, excess constituents were distilled.

Polyorganosiloxane B:

In a first reaction stage, in a three-neck flask, 148.58 g (0.059 mol) of polyhydromethylsiloxane, 37.29 g (0.230 mol) of hexamethyldisiloxane and 514.13 g (1.731 mol) of octamethylcyclotetrasiloxane were converted under an acid-activated calcium bentonite catalyst (3%) to a methylhydrodimethylpolysiloxane. This methylhydrodimethylpolysiloxane had the following average composition:

$$M_2D^H{}_8D_{24},$$

which means that, among the silicon atoms of the total of (on average) 34 siloxane units in the compound, (an average of) 8 are each substituted by a hydrogen atom ($D^H$) and are amenable to a subsequent functionalization.

In the second reaction stage, 38.96 g (0.309 mol) of allyl methacrylate were heated to 60° C. with addition of an inhibitor (butylhydroxytoluene 0.1%). This was followed by the addition of the catalyst (10 ppm of Karstedt catalyst), and then 124.72 g (0.051 mol) of the methylhydrodimethylpolysiloxane prepared in the first stage were slowly added dropwise at a maximum temperature of 70° C. This was followed by the slow addition of 36.32 g (0.144 mol) of 1-octadecene at 60° C. The reaction which then took place proceeded at 80° C. and was monitored by means of an HSi measurement by infrared spectroscopy. Once no HSi was detectable any longer, i.e. the reaction was complete, excess constituents were distilled.

Polyorganosiloxane C:

In a first reaction step, as described for polyorganosiloxane B, a methylhydrodimethylpolysiloxane with the average composition:

$$M_2D^H{}_8D_{24}$$

was prepared.

In the second reaction stage, 52.06 g (0.413 mol) of allyl methacrylate and 16.4 g (0.065 mol) of 1-octadecene were heated to 60° C. with addition of an inhibitor (butylhydroxytoluene 0.1%). This was followed by the addition of the catalyst (10 ppm of Karstedt catalyst) and a slow addition of 131.54 g (0.054 mol) of the methylhydrodimethylpolysiloxane mentioned. The reaction which then took place proceeded at 95° C. and was monitored by means of an HSi measurement by infrared spectroscopy. Once no HSi was detectable any longer, i.e. the reaction was complete, excess constituents were distilled.
Polyorganosiloxane D:

In a first reaction stage, in a three-neck flask, 71.69 g (0.029 mol) of polyhydromethylsiloxane, 47.29 g (0.291 mol) of hexamethyldisiloxane and 581.21 g (1.957 mol) of octamethylcyclotetrasiloxane were reacted under an acid-activated calcium bentonite catalyst (3%) to give a methylhydrodimethylpolysiloxane. This methylhydrodimethylpolysiloxane had the following (average) composition:

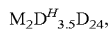
$M_2D^H{}_{3.5}D_{24}$, which means that, among the silicon atoms of the total of (on average) 29.5 siloxane units in the compound, (an average of) 3.5 are each substituted by a hydrogen atom ($D^H$) and are amenable to a subsequent functionalization.

In the second reaction stage, 28.68 g (0.227 mol) of allyl methacrylate, 12.72 g (0.050 mol) of 1-octadecene and 15.86 g (10% of the starting weight, 0.007 mol) of the methylhydrodimethylpolysiloxane prepared in the first stage were heated to 60° C. with addition of an inhibitor (butylhydroxytoluene 0.1%). This was followed by the addition of the catalyst (10 ppm of Karstedt catalyst), and the remaining 142.74 g (0.066 mol) of the methylhydrodimethylpolysiloxane were slowly added dropwise. The reaction which took place proceeded at 95° C. and was monitored by means of an HSi measurement by infrared spectroscopy. Once no HSi was detectable any longer, i.e. the reaction was complete, excess constituents were distilled.

The polyorganosiloxanes A to D are not terminally functionalized, but rather the functionalization with methacrylate or n-octadecyl groups is—randomly distributed—present in difunctional siloxane units whose silicon atoms bear a methacrylate or n-octadecyl group and a methyl group. The (average) functionalization of the polyorganosiloxanes A to D is reproduced in Table 1 below:

TABLE 1

| Polyorgano-siloxane | Functional-ization[a] | Methacrylate functionalization, %[b] | n-Octadecyl functionalization, %[b] |
|---|---|---|---|
| A | 3/42 | 0[c] | 100 (7.1) |
| B[d] | 8/34 | 75 (17.6) | 25 (5.9) |
| C[d] | 8/34 | 95 (22.4) | 5 (1.2) |
| D[d] | 3.5/29.5 | 95 (11.3) | 5 (0.6) |

[a] what is stated is the number of functionalized difunctional siloxane units/the total number of siloxane units.
[b] based on the total number of functionalized siloxane units (based on the total number of siloxane units).
[c] no crosslinkable functionality.
[d] inventive.

(ii) Production of Vulcanization Mixtures

A mixture consisting of 100 parts by weight of EPM rubber (Keltan 740), 100 phr of calcined kaolin (Polestar 200 R) and 30 phr of paraffinic mineral oil (Sunpar 2280) was produced in the upside-down mixing process.

Subsequently, the batch was divided into 5 equal portions by weight, and peroxide and additives were mixed in on a roller system. Only 8 phr of peroxide (Trigonox 101-45B-pd) were added to one portion by weight (control/blank sample). 8 phr of peroxide (Trigonox 101-45B-pd) and 4 phr of particular polyorganosiloxanes were mixed into each of the four further portions by weight with a roller system. The polyorganosiloxane used in the vulcanization mixtures and the Mooney viscosity of the vulcanization mixture are reported in Table 2.

TABLE 2

| Vulcanization mixture | Polyorganosiloxane | Mooney viscosity[d] |
|---|---|---|
| 1[a] | — | 71 |
| 2[b] | A | 67 |
| 3[c] | B | 64 |
| 4[c] | C | 63 |
| 5[c] | D | 64 |

[a] Comparison: vulcanization mixture without polyorganosiloxane (blank sample).
[b] Comparison: no crosslinkable functionality.
[c] Inventive.
[d] DIN 53523 part 3: testing of plastics and elastomers; testing with the shearing disk viscometer according to Mooney, determination of the viscosity according to Mooney.

Using the example of the Mooney viscosity, it is thus demonstrated that the polyorganosiloxanes functionalized in accordance with the invention result in an improvement in the processing properties, the functionalization with the unsaturated functionality $R^1$ surprisingly contributing to this improvement.

(iii) Production of Vulcanizates

Vulcanization mixtures 1 to 5 were used to produce test sheets of thickness 2 mm and 6 mm, which were vulcanized at 180° C. for about 20 min. The test specimens 1 to 5 obtained exhibited the properties listed in Table 3.

TABLE 3

| | Elongation at break[1] | 100% modulus[1] | 300% modulus[1] | 500% modulus[1] | Compression set[2] | Tear propagation resistance[3] |
|---|---|---|---|---|---|---|
| 1 | 884 | 1.5 | 3.0 | 3.7 | 29.2 | 13.2 |
| 2 | 881 | 1.3 | 2.3 | 2.8 | 30.7 | 12.8 |
| 3 | 736 | 1.5 | 4.1 | 5.2 | 23.5 | 11.6 |
| 4 | 751 | 1.7 | 4.1 | 5.2 | 20.6 | 10.2 |
| 5 | 855 | 1.7 | 3.3 | 4.2 | 25.7 | 12.1 |

[1]DIN 53504: Testing of plastics and elastomers; determination of tear resistance, tensile strength, elongation at break and stress value in the tensile test. Modulus values in MPa.
[2]DIN ISO 815: Determination of the compression set at ambient, elevated and low temperatures: 22 h/75° C./25%.
[3]DIN ISO 34-1: Elastomers or thermoplastic elastomers-determination of the tear propagation resistance.

The values for modulus and compression set in Table 3 demonstrate that the inventive functionalization in some cases results in a distinct improvement in the mechanical values when the rubber is vulcanized using the inventive polyorganosiloxanes.

As expected, elongation at break corresponds to the modulus values. As expected, the increase in the crosslinking density by means of the inventive polyorganosiloxanes for the test specimens obtained from mixtures 3, 4 and 5 results in lower values being determined for the elongation at break; at the same time, the moduli rise. In the test specimen obtained from mixture 5, the decrease is relatively low, since the proportion of crosslinkable groups in the polyorganosiloxane used is relatively low at 10.9%, or 3.3 units per polymer chain.

(iv) Production of Vulcanization Mixtures 100 parts by weight of EPDM rubber (Keltan 2340 A), 100 phr of calcined kaolin (Polestar 200 R) and 30 phr of paraffinic mineral oil (Sunpar 2280) were used to produce a mixture in the upside-down mixing process.

Subsequently, the mixture was divided into 5 equal portions by weight, and peroxide and additives were mixed in on a roller system. Only 8 phr of peroxide (Trigonox 101-45B-pd) were added to one portion by weight (control/blank sample). 8 phr of peroxide (Trigonox 101-45B-pd) and a particular amount of polyorganosiloxane and/or processing aid and/or coagent were mixed into each of the four further portions by weight with a roller system (see Table 4). The Mooney viscosity of the vulcanization mixtures thus obtained is reported in Table 5.

TABLE 4

| Vulcanization mixture | Polyorgano-siloxane | Processing aid | Coagent |
|---|---|---|---|
| 6[a)] | — | — | — |
| 7[b)] | — | — | 1 phr TAC 70% DL[f)] |
| 8[c)] | — | 1 phr Struktol WS 180 | 2 phr TAC 70% DL[f)] |
| 9[d)] | 1.5 phr C | — | — |
| 10[d) e)] | 0.75 phr C | — | 0.75 phr TAC 70% DL[f)] |

[a)] Comparison: Vulcanization mixture without polyorganosiloxane (blank sample) and without processing aid or coagent.
[b)] Comparison: with 1 phr of coagent TAC.
[c)] Comparison: with 1 phr of conventional processing aid Struktol WS 180 and 2 phr of coagent TAC.
[d)] Inventive.
[e)] With 0.75 phr of polyorganosiloxane and 0.75 of coagent TAC.
[f)] Dry Liquid composed of 70% TAC with silica as a carrier material

TABLE 5

| Vulcanization mixture | Polyorganosiloxane | Mooney viscosity[f)] |
|---|---|---|
| 6[a)] | — | 37 |
| 7[b)] | — | 37 |
| 8[c)] | — | 33 |
| 9[d)] | C | 34 |
| 10[d)e)] | C | 35 |

[a)] Comparison: Vulcanization mixture without polyorganosiloxane (blank sample) and without processing aid or coagent.
[b)] Comparison: with 1 phr of coagent TAC.
[c)] With 1 phr of processing aid Struktol WS 180 and 2 phr of coagent TAC.
[d)] Inventive.
[e)] With only 0.75 phr of polyorganosiloxane and 0.75 of coagent TAC.
[f)] DIN 53523 part 3: testing of plastics and elastomers; testing with the shearing disk viscometer according to Mooney, determination of the viscosity according to Mooney.

Using the example of the Mooney vicosity, this demonstrates that the polyorganosiloxanes functionalized in accordance with the invention result in an improvement in the processing properties compared to the control mixture 6, the functionalization with the unsaturated functionality $R^1$ surprisingly contributing to this improvement.

(v) Production of Vulcanizates

Vulcanization mixtures 6 to 10 were used to produce test sheets of thickness 2 mm and 6 mm, which were vulcanized at 180° C. for about 20 min. The test specimens 6 to 10 obtained exhibited the properties listed in Table 6.

TABLE 6

| | Elongation at break[(1)] | Tensile strength[(1)] | 100% modulus[(1)] | 300% modulus[(1)] | Compression set[(2)] | Tear propagation resistance[(3)] |
|---|---|---|---|---|---|---|
| 6 | 345 | 3.9 | 2.1 | 3.6 | 7.9 | 2.7 |
| 7 | 274 | 4.6 | 2.7 | — | 5.7 | 2.1 |
| 8 | 239 | 4.8 | 3.0 | — | 4.6 | 2.1 |
| 9 | 333 | 5.1 | 2.6 | 4.9 | 3.9 | 2.3 |
| 10 | 273 | 4.9 | 2.8 | — | 3.9 | 2.2 |

[(1)]DIN 53504: Testing of plastics and elastomers; determination of tear resistance, tensile strength, elongation at break and stress value in the tensile test. Modulus values in MPa.
[(2)]DIN ISO 815: Determination of the compression set at ambient, elevated and low temperatures: 72 h/70° C./25%.
[(3)]DIN ISO 34-1: Elastomers or thermoplastic elastomers-determination of the tear propagation resistance.

The values for tensile strength, modulus and compression set in Table 6 confirm that the inventive functionalization in some cases gives a distinct improvement in the mechanical values when the rubber is vulcanized using the inventive polyorganosiloxanes. The combination of inventive polyorganosiloxane with coagent TAC (50/50) in mixture 10 gives similar values to the use of the same total amount of the inventive polyorganosiloxane in mixture 9. However, as a result of the sole use of the inventive siloxane in mixture 9, a higher elongation at break is found, which is advantageous in applications in which, for example, the rubber articles obtained have to be demolded (application of injection molding). With regard to the compression set, the lowest values were found in mixtures 9 and 10 which comprise the inventive polyorganosiloxane. The combination of inventive polyorganosiloxane and coagent TAC (50/50) in mixture 10 compared to mixture 5 is supported by the higher value in the 100% modulus.

The invention claimed is:

1. A method of processing rubber characterized in that the processing is a peroxidic vulcanization, said method comprising reacting the rubber with 0.5 to 10 parts by weight of a polyorganosiloxane, based on 100 parts by weight of the rubber, said polyorganosiloxane having 3 or more siloxane units and having
    (i) one or more organic moieties $R^1$, where $R^1$ has one or more carbon-carbon multiple bonds, and
    (ii) one or more hydrocarbon moieties $R^2$, where $R^2$ has a chain length of 5 to 50 carbon atoms.

2. The method of claim 1, characterized in that the carbon-carbon multiple bond of the moiety $R^1$ of the polyorganosiloxane is a double bond.

3. The method of claim 1, characterized in that the organic moiety $R^1$ is a monovalent radical.

4. The method of claim 3, characterized in that the $R^1$ radical is (x), (y) or (z):

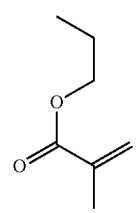

(x)

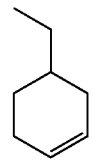

(y)

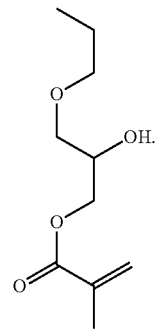

(z)

5. The method of claim 1, characterized in that the polyorganosiloxane has the structural unit I

$$[R^1_x R_a SiO_{[4-(x+a)]/2}] \qquad (I)$$

where x is 1, 2 or 3, a is 0, 1 or 2, and R is a monovalent organic radical.

6. The method of claim 1, characterized in that the hydrocarbon moiety $R^2$ is a monovalent hydrocarbyl radical.

7. The method of claim 6, characterized in that the $R^2$ radical is selected from branched or unbranched alkyl groups.

8. The method of claim 1, characterized in that the polyorganosiloxane improves the release performance on a roller system or in an internal mixer, reduces the Mooney viscosity, increases the modulus of the vulcanized rubber mixture, tensile strength, reduces the compression set, reduces elongation at break and/or reduces tear propagation resistance.

9. The method of claim 1, characterized in that the rubber is selected from NR, BR, NBR, HNBR, EPM, EPDM, CR, PE, CM, CSM, GECO, FKM, FFKM, TFE/P, ACM, AEM, EVA, EVM, VMQ, PMQ, PVMQ, FVMQ and TPE.

10. A process for vulcanizing rubber, in which a vulcanization mixture which comprises
   (i) one or more peroxidically crosslinkable rubbers,
   (ii) one or more peroxidic vulcanizing agents, and
   (iii) 0.5 to 10 parts by weight of one or more polyorganosiloxanes, based on 100 parts by weight of the rubber, said polyorganosiloxanes each having 3 or more siloxane units and having
      (a) one or more organic moieties $R^1$, where $R^1$ has one or more carbon-carbon multiple bonds, and
      (b) one or more hydrocarbon moieties $R^2$, where $R^2$ has a chain length of 5 to 50 carbon atoms,
is peroxidically vulcanized.

11. A vulcanized rubber producible or produced by the process as claimed in claim 10.

* * * * *